E. S. MILLS.
TRACTOR DRIVE.
APPLICATION FILED AUG. 10, 1916.
1,296,997.
Patented Mar. 11, 1919.
2 SHEETS—SHEET 1.
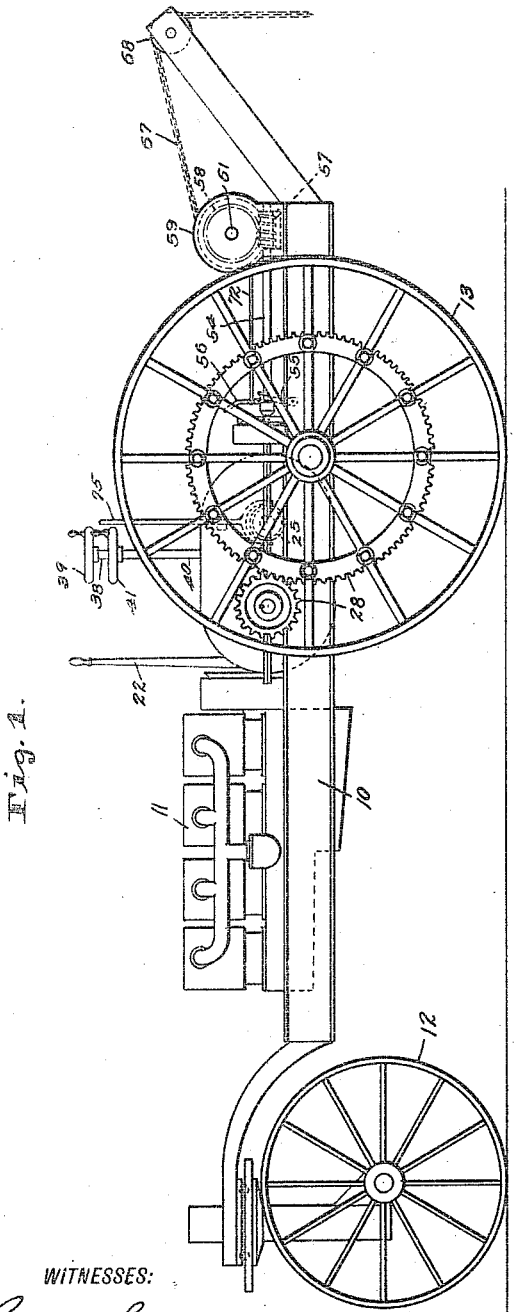
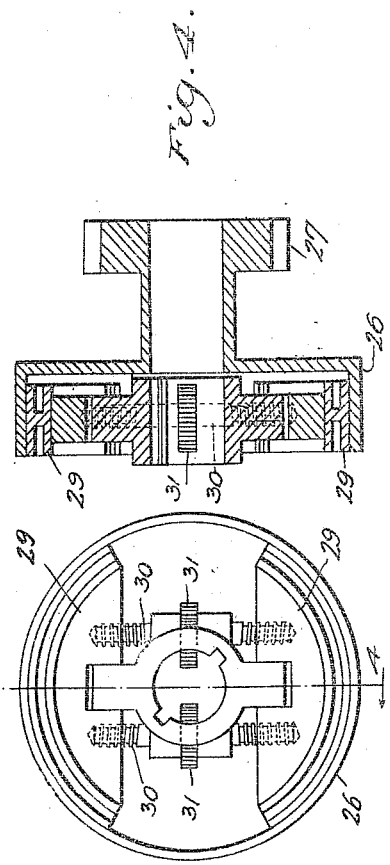
WITNESSES:
INVENTOR
Emory S. Mills,
BY
ATTORNEYS

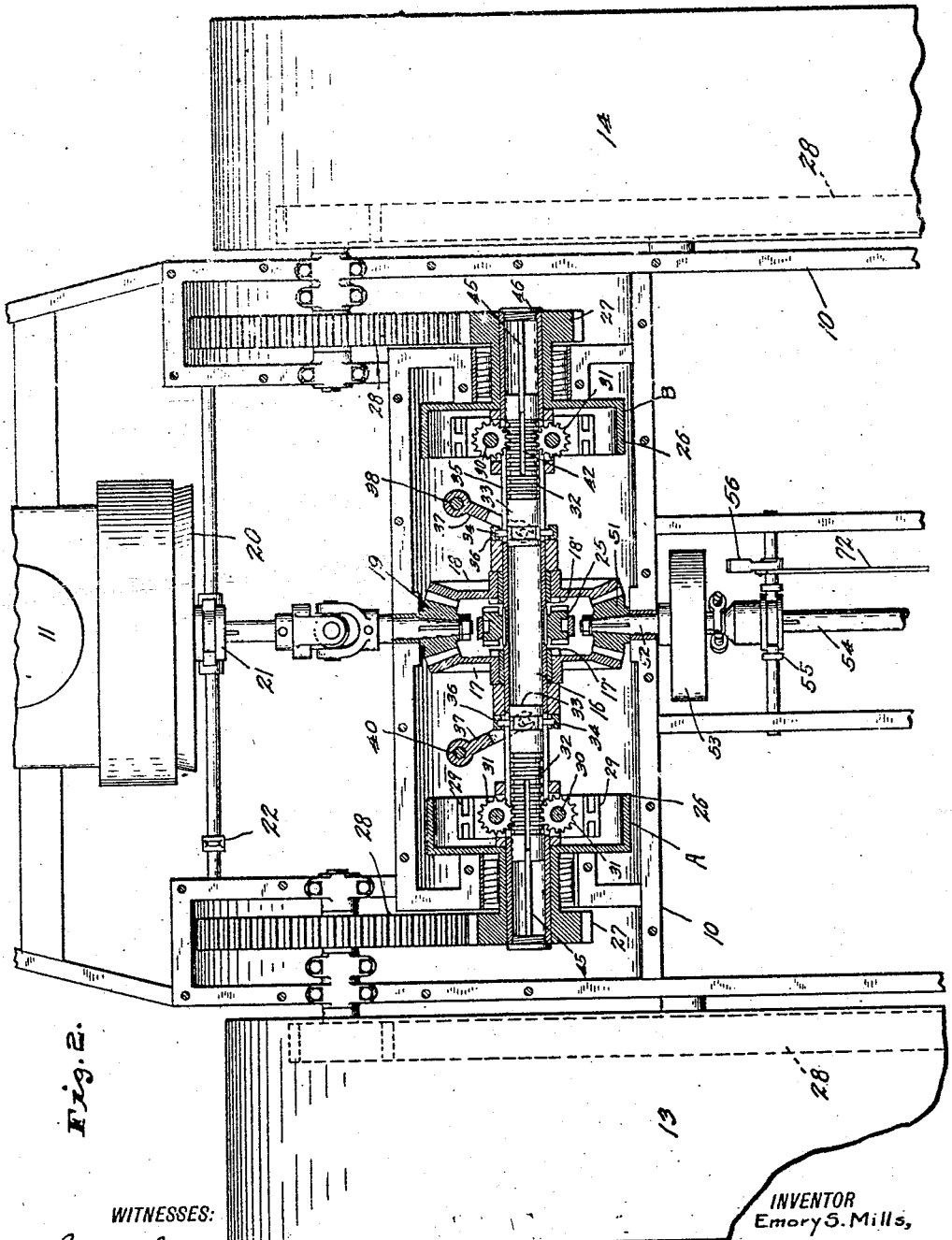

UNITED STATES PATENT OFFICE.

EMORY S. MILLS, OF MUNCIE, INDIANA, ASSIGNOR TO MUNCIE WHEEL COMPANY, OF MUNCIE, INDIANA, A CORPORATION OF INDIANA.

TRACTOR-DRIVE.

1,296,997.            Specification of Letters Patent.      Patented Mar. 11, 1919.

Application filed August 10, 1916.   Serial No. 114,086.

*To all whom it may concern:*

Be it known that I, EMORY S. MILLS, a citizen of the United States, residing at Muncie, in the county of Delaware and State of Indiana, have invented a new and useful Tractor-Drive, of which the following is a specification.

The object of my invention is to produce a simple, compact and efficient driving train for farm tractors, of such character that the traction wheels may be independently driven in either direction.

The accompanying drawings illustrate my invention.

Figure 1 is a side elevation of a tractor embodying my invention; Fig. 2 a plan in partial horizontal section, on a larger scale; Fig. 3 an elevation of one of the clutches; and Fig. 4 a section on line 4—4 of Fig. 3.

In the drawings, 10 indicates a main supporting frame, provided with a motor 11, and a forward steering truck 12. At the rear end frame 10 is provided with two independent traction wheels 13 and 14, which are driven independently through the medium of the clutches A and B, respectively, journaled on a jack shaft 16 which is hollow. Journaled on the middle of the jack shaft 16 are two bevel gears 17 and 18, both of which mesh with an intermediate bevel pinion 19 which is connected through clutch 20 with the engine 11, said clutch being controlled by a rock shaft 21, operated by a hand lever 22. Splined upon the jack shaft 16, between the two gears 17 and 18, is a double-faced clutch 25 adapted to engage alternately with either of the clutch faces 17' and 18' carried by the gears 17 and 18, respectively.

The two clutches A and B are journaled at opposite ends of the jack shaft 16, and each comprises a friction drum 26 carrying a pinion 27, connecting through a suitable train of gears 28 with the adjacent traction wheel 13 or 14. Each of the clutch members also comprises a pair of friction shoes 29, 29, mounted within the drum 26 and supported upon the ends of screws 30, 30, which are oppositely threaded at their ends and at their middles provided with a pinion 31 which meshes with teeth 32 formed on a pin 33 slidably mounted within the shaft 16. Pin 33 at one end is provided with fingers 34 which project out through slots 35 formed in shaft 16, and said fingers connect with a collar 36 which may be axially shifted by a yoke 37. One of the yokes 37 is carried by a vertical shaft 38, provided with an operating head 39, and the other of said yokes 37 is carried by a vertical shaft 40, provided with an operating head 41. In order to prevent pin 33 from rotating, it is diametrically slotted, as indicated at 42, and into this slot is projected a thin fin 45 carried by a threaded head 46 screwed into the end of the hollow jack shaft.

Also meshing with the gears 17 and 18 is a bevel pinion 51, carried by a shaft 52, which is projected rearwardly, and provided with one portion of a clutch 53, the other portion being carried by a shaft 54, and being controlled by a yoke 55 operated by a foot lever 56.

Shaft 54 is extended to the rear of frame 10 and associated with power-transmitting mechanism for driving some additional devices.

The operation is as follows: The jack shaft 16 may be rotated in either direction by a shifting of clutch 25 by means of a hand lever 75 and when the shaft is rotated in either direction, either one or both of the clutches A and B may be connected to the shaft for rotation therewith, by manipulation of the shafts 38 and 40, so that the tractor may be readily maneuvered.

Shaft 52 will rotate constantly, while the shaft 54 will be under the control of lever 56.

I claim as my invention:

1. In a tractor, the combination with a main body, two independent traction wheels and a motor mounted on the main body, of a jack shaft journaled on the main body, a pair of bevel gears journaled on the jack shaft, a driving pinion connected with the engine and meshing with both said bevel gears, a clutch splined on the jack shaft and shiftable into clutching engagement with either of said bevel gears, means by which said clutch may be shifted, a gear train associated with each end of the jack shaft and leading to the adjacent traction wheel, a clutch between each end of the jack shaft and the associated gear train, means for independently manipulating said last-named clutches, a driven pinion meshing with the two bevel gears, and a driven shaft on which said driven pinion is mounted.

2. In a tractor, the combination with a main body, two independent traction wheels and a motor mounted on the main body, of a hollow jack shaft journaled within two clutch members journaled on the main body, mating clutch members mounted on the jack shaft and coöperating with said first-mentioned clutch members, said mating clutch members comprising friction shoes carried by threaded shafts, each provided with a driving pinion, a rack pin mounted within the jack shaft at each end and operatively engaging the adjacent friction shoe pin, means for shifting said rack pins independently, a pair of bevel gears journaled upon the jack shaft, a driving pinion connected to the motor and meshing with both of said bevel gears, a clutch splined upon the jack shaft and adapted to engage either of said gears, and means for shifting said last-mentioned clutch.

In witness whereof, I have hereunto set my hand at Muncie, Indiana, this fourth day of August, A. D. one thousand nine hundred and sixteen.

EMORY S. MILLS.